(12) United States Patent
Nagano et al.

(10) Patent No.: US 11,440,286 B2
(45) Date of Patent: Sep. 13, 2022

(54) LAMINATE AND SKIN MATERIAL FOR VEHICLE INTERIOR MEMBER

(71) Applicants: INOAC CORPORATION, Nagoya (JP); INOAC TECHNICAL CENTER CO., LTD., Nagoya (JP)

(72) Inventors: Yuya Nagano, Kanagawa (JP); Hideo Ota, Kanagawa (JP); Takahiro Inoue, Kanagawa (JP); Shimpei Tokai, Aichi (JP)

(73) Assignees: INOAC CORPORATION, Nagoya (JP); INOAC TECHNICAL CENTER CO., LTD., Nagoya (JP)

( * ) Notice: Subject to any disclaimer, the term of this patent is extended or adjusted under 35 U.S.C. 154(b) by 134 days.

(21) Appl. No.: 16/957,556

(22) PCT Filed: Dec. 21, 2018

(86) PCT No.: PCT/JP2018/047248
§ 371 (c)(1),
(2) Date: Jun. 24, 2020

(87) PCT Pub. No.: WO2019/131507
PCT Pub. Date: Jul. 4, 2019

(65) Prior Publication Data
US 2020/0316905 A1    Oct. 8, 2020

(30) Foreign Application Priority Data

Dec. 25, 2017 (JP) .............................. JP2017-248481
Sep. 19, 2018 (JP) .............................. JP2018-174726
Nov. 8, 2018 (JP) .............................. JP2018-210967

(51) Int. Cl.
*B32B 5/18*    (2006.01)
*B32B 7/12*    (2006.01)
(Continued)

(52) U.S. Cl.
CPC .................. *B32B 5/18* (2013.01); *B32B 7/12* (2013.01); *B32B 27/065* (2013.01); *B32B 27/40* (2013.01);
(Continued)

(58) Field of Classification Search
CPC .......... B32B 5/18; B32B 7/12; B32B 27/065; B32B 27/40; B32B 2266/0278;
(Continued)

(56) References Cited

U.S. PATENT DOCUMENTS 4,508,774 A * 4/1985 Grabhoefer .......... C08G 18/797
428/220
7,612,151 B2    11/2009 Minamida et al.
(Continued)

FOREIGN PATENT DOCUMENTS

EP    0627451 A2 * 12/1994 ............. C08G 18/10
JP    5-140528 A    6/1993
(Continued)

OTHER PUBLICATIONS

Translation of JP 2007 002036A, Muramatsu et al., Jan. 11, 2007. (Year: 2007).*
(Continued)

*Primary Examiner* — Hai Vo
(74) *Attorney, Agent, or Firm* — Sughrue Mion, PLLC (57) ABSTRACT

The present invention provides a laminate 10 including: a foamed polyurethane layer 11 obtained from a foamable polyurethane resin composition containing an active hydrogen group-containing tin ricinoleate and a phosphorus-containing solid flame retardant; and a coating layer 15 adhered to the foamed polyurethane layer 11 by a polyurethane hot melt adhesive 13 containing a polyurethane pre-
(Continued)

polymer (I) obtained by using a polyol component (A) and a polyisocyanate component (B) as raw materials, and a catalyst (II).

9 Claims, 2 Drawing Sheets

(51) Int. Cl.
*B32B 27/06* (2006.01)
*B32B 27/40* (2006.01)
*C08G 18/08* (2006.01)
*C08G 18/24* (2006.01)
*C09J 11/06* (2006.01)
*C09J 175/08* (2006.01)

(52) U.S. Cl.
CPC ............ *C08G 18/14* (2013.01); *C08G 18/244* (2013.01); *C09J 11/06* (2013.01); *C09J 175/08* (2013.01); *B32B 2255/102* (2013.01); *B32B 2255/26* (2013.01); *B32B 2266/0278* (2013.01); *B32B 2307/3065* (2013.01); *B32B 2605/003* (2013.01); *C08G 2110/0083* (2021.01)

(58) Field of Classification Search
CPC ........ C08G 18/14; C08G 18/244; C09J 11/06; C09J 175/08
See application file for complete search history.

(56) References Cited

U.S. PATENT DOCUMENTS

| | | | |
|---|---|---|---|
| 8,025,959 B2 | 9/2011 | Hashiba et al. | |
| 8,808,495 B2 | 8/2014 | Carlson et al. | |
| 8,815,968 B2 | 8/2014 | Rowlands et al. | |
| 9,453,152 B2 | 9/2016 | Carlson et al. | |
| 2002/0013406 A1* | 1/2002 | Li | C08G 18/12 525/28 |
| 2007/0232764 A1 | 10/2007 | Minamida et al. | |
| 2010/0227151 A1 | 9/2010 | Rowlands et al. | |
| 2010/0305228 A1 | 12/2010 | Gossner et al. | |
| 2010/0323182 A1 | 12/2010 | Hashiba et al. | |
| 2012/0263836 A1 | 10/2012 | Carlson et al. | |
| 2013/0041058 A1* | 2/2013 | Emmrich-Smolczyk | C08G 18/222 521/125 |
| 2014/0242396 A1 | 8/2014 | Kanagawa et al. | |
| 2014/0322400 A1 | 10/2014 | Carlson et al. | |
| 2014/0329923 A1 | 11/2014 | Rowlands et al. | |
| 2014/0336347 A1 | 11/2014 | Rowlands et al. | |
| 2015/0099125 A1 | 4/2015 | Kanagawa et al. | |
| 2016/0215186 A1 | 7/2016 | Ninomiya et al. | |

FOREIGN PATENT DOCUMENTS

| | | | |
|---|---|---|---|
| JP | 8-283691 A | 10/1996 | |
| JP | 9-132629 A | 5/1997 | |
| JP | 2003-138243 A | 5/2003 | |
| JP | 2005-320520 A | 11/2005 | |
| JP | 2007002036 A | * 1/2007 | |
| JP | 2007-91996 A | 4/2007 | |
| JP | 2010-275551 A | 12/2010 | |
| JP | 2011-765 A | 1/2011 | |
| JP | 2014-516321 A | 7/2014 | |
| JP | 2015-120323 A | 7/2015 | |
| JP | 2015-193854 A | 11/2015 | |
| JP | 2016-204541 A | 12/2016 | |
| JP | 2017-31273 A | 2/2017 | |
| JP | 2017-136735 A | 8/2017 | |
| JP | 2018-177937 A | 11/2018 | |
| WO | 2013/061790 A1 | 5/2013 | |
| WO | 2013/153907 A1 | 10/2013 | |
| WO | 2015/045635 A1 | 4/2015 | |

OTHER PUBLICATIONS

International Search Report dated Mar. 12, 2019 issued by the International Searching Authority in counterpart International Application No. PCT/JP2018/047248 (PCT/ISA/210).

Written Opinion dated Mar. 12, 2019 issued by the International Searching Authority in counterpart International Application No. PCT/JP2018/047248 (PCT/ISA/237).

* cited by examiner

| | | Ex. B1 | Ex. B2 | Com Ex. B1 | Com Ex. B2 | Com Ex. B3 | Com Ex. B4 | Com Ex. B5 | Com Ex. B6 | Com Ex. B7 | Com Ex. B8 | Com Ex. B9 | Com Ex. B10 | Com Ex. B11 | Com Ex. B12 |
|---|---|---|---|---|---|---|---|---|---|---|---|---|---|---|---|
| Foamable polyurethane resin composition | Polyol | 100 | 100 | 100 | 100 | 100 | 100 | 100 | 100 | 100 | 100 | 100 | 100 | 100 | 100 |
| | Flame retardant 1 | 4 | 4 | | 4 | 4 | 4 | 4 | 4 | 15 | 20 | | | 4 | 4 |
| | Flame retardant 2 | 4 | 4 | 5 | 4 | 4 | 4 | 4 | 4 | | | 5 | | 4 | 4 |
| | Flame retardant 3 | | | | | | | | | | | | 4 | | |
| | Foaming agent (water) | 3.95 | 3.95 | 3.9 | 3.95 | 3 | 3.95 | 3.95 | 3.95 | 4.3 | 4.7 | 3.9 | 3.95 | 3 | 3 |
| | Foam stabilizer | 1.1 | 1.1 | 1.1 | 1.1 | 1.5 | 1.1 | 1.1 | 1.1 | 1.1 | 1.1 | 1.1 | 1.1 | 1.5 | 1.5 |
| | Amine catalyst | 0.18 | 0.18 | 0.16 | 0.18 | 0.1 | 0.18 | 0.18 | 0.18 | 0.18 | 0.18 | 0.18 | 0.18 | 0.1 | 0.1 |
| | Metal catalyst 1 | 1.3 | 1.3 | 0.8 | 1.3 | 2.75 | 1.3 | 1.3 | 1.3 | | | | 1.3 | 2.75 | 2.75 |
| | Metal catalyst 2 | | | | | | | | | 0.31 | 0.31 | 0.31 | | | |
| | Isocyanate INDEX | 103 | 103 | 103 | 103 | 110 | 103 | 103 | 103 | 103 | 103 | 103 | 103 | 110 | 110 |
| Foamed polyurethane layer | Density (kg/m³) | 25.7 | 25.7 | 25.0 | 25.7 | 34.9 | 25.7 | 25.7 | 25.7 | 24.6 | 25.5 | 25.6 | 24.8 | 34.9 | 34.9 |
| | Tensile strength (kPa) | 90 | 90 | 97 | 90 | 132 | 90 | 90 | 90 | 70 | 56 | 114 | 105 | 132 | 132 |
| | Elongation (%) | 216 | 216 | 198 | 216 | 204 | 216 | 216 | 216 | 97 | 64 | 206 | 201 | 204 | 204 |
| Adhesion method | Adhesive | Hot melt adhesive 6 | Hot melt adhesive 7 | Hot melt adhesive 1 | Hot melt adhesive 1 | Hot melt adhesive 1 | Hot melt adhesive 2 | Hot melt adhesive 3 | Hot melt adhesive 4 | Hot melt adhesive 1 | Hot melt adhesive 1 | Hot melt adhesive 1 | Hot melt adhesive 1 | Frame lamination | Hot melt adhesive 5 |
| | Moist heat resistance | ○ | ○ | × | × | × | × | × | × | × | × | × | × | × | × |
| | Storage stability | ○ | ○ | ○ | ○ | ○ | ○ | ○ | ○ | ○ | ○ | ○ | ○ | ○ | ○ |
| | Thermal stability | ○ | ○ | ○ | ○ | ○ | ○ | ○ | ○ | ○ | ○ | ○ | ○ | ○ | ○ |
| Coating layer | | Nylon | Nylon | Nylon | Nylon | Nylon | Nylon | Nylon | Nylon | Nylon | Nylon | Nylon | Nylon | Nylon | Nylon |
| Flammability | Burning distance (mm) | 0 | 0 | 0 | 0 | 0 | 0 | 0 | 0 | 10 | 0 | 0 | 0 | 0 | 0 |
| | Determination | Non-flammable | Non-flammable | Non-flammable | Non-flammable | Non-flammable | Non-flammable | Non-flammable | Non-flammable | Self-extinguishing | Non-flammable | Non-flammable | Non-flammable | Non-flammable | Non-flammable |
| VOC and the like | VOC (ppm) | 70 | 72 | 79 | 74 | 86 | 70 | 69 | 88 | 446 | 434 | 639 | 219 | 260 | 128 |
| | FOG (ppm) | 31 | 30 | 30 | 42 | 59 | 34 | 41 | 53 | 43 | 61 | 78 | 1242 | - | 219 |
| | TVOC (μgC/g) | 13 | 9 | 18 | 15 | 3 | 14 | 8 | 10 | - | - | - | - | - | 16 |
| | Evaluation | ○ | ○ | ○ | ○ | △ | ○ | ○ | ○ | × | × | × | × | × | × |
| Comprehensive evaluation | | ○ | ○ | △ | △ | △ | △ | △ | △ | × | × | × | × | × | × |

LAMINATE AND SKIN MATERIAL FOR VEHICLE INTERIOR MEMBER

CROSS-REFERENCE TO RELATED APPLICATIONS

This application is a National Stage of International Application No. PCT/JP2018/047248, filed Dec. 21, 2018, claiming priority based on Japanese Patent Application No. 2017-248481, filed Dec. 25, 2017, Japanese Patent Application No. 2018-174726, filed Sep. 19, 2018, and Japanese Patent Application No. 20189-210967, filed Nov. 8, 2018, the contents of all of which are incorporated herein by reference in their entirety.

TECHNICAL FIELD

The present invention relates to a laminate and a skin material for vehicle interior member using the laminate.

BACKGROUND ART

For example, as a skin material for covering a surface of a vehicle seat cushion, there is a laminate in which a coating layer is adhered to one surface of a foamed polyurethane layer and a surface layer is adhered to the other surface of the foamed polyurethane layer. The skin material is shaped to cover the seat cushion by cutting and sewing.

The coating layer is provided to improve the slipperiness for improving the work at the time of sewing or the work at the time of covering the skin material on the seat cushion, and to protect a back surface of the foamed polyurethane layer.

On the other hand, the surface layer is made of an appropriate material including genuine leather, synthetic leather, or fabrics in accordance with the decorativeness and tactility required for the vehicle seat.

In addition, since a skin material to be covered on the surface of the vehicle seat cushion is required to have heat resistance, there is a material using a polyurethane reactive hot melt adhesive for adhering a foamed polyurethane layer to a coating layer and a surface layer (Patent Literature 1). The polyurethane reactive hot melt adhesive contains, as a main component, a polyurethane prepolymer obtained by a reaction between a polyester polyol and a polyisocyanate.

It is desired that an adhesive used for the vehicle seat cushion has a small amount of organic volatile components that influence the human body. Patent Literature 2 discloses a low outgassing olefin hot melt adhesive as such a low outgassing hot melt adhesive.

CITATION LIST

Patent Literature

Patent Literature 1: JP-A-2017-136735
Patent Literature 2: JP-A-2017-031273

SUMMARY OF INVENTION

Problems that the Invention is to Solve

The skin material for covering the surface of the vehicle seat cushion is required to have a small amount of volatile organic compounds (VOC) that adversely influence the human body. In addition, the amount of the VOC of the skin material for covering the surface of the vehicle seat cushion varies depending on the material of the surface layer, and even when the same type of genuine leather or the like is used, the amount of the VOC varies depending on a portion of the material as used. Further, the olefin hot melt adhesive can achieve a low VOC, but the use thereof is limited from the viewpoint of heat resistance and the like, and it is difficult to use it for vehicles and the like.

The present invention has been made in view of the above points, and aims to reduce the amount of the VOC in a laminate including a foamed polyurethane layer and a coating layer, to which a surface layer tending to vary in the amount of the VOC depending on the material or the like is not adhered, and accordingly, to reduce the amount of the VOC in a skin material for vehicle interior member to which a surface layer made of a predetermined material is adhered.

Further, the skin material for vehicle interior member is required to have flame retardancy in consideration of a vehicle fire or the like. Further, good thermal characteristics (particularly, heat resistance and thermal stability) are required for use in vehicles. The present invention has an object to provide a laminate and a skin material for vehicle interior member, which have a low VOC, good flame retardancy, and good thermal characteristics.

Means for Solving the Problems

A laminate of the present invention, which can solve the above problems, is (1) a laminate comprising:
a foamed polyurethane layer obtained from a foamable polyurethane resin composition containing a polyol, a polyisocyanate, a foaming agent, a catalyst and a flame retardant; and a coating layer mounted on the foamed polyurethane layer, wherein
the foamable polyurethane resin composition contains an active hydrogen group-containing tin ricinoleate as the catalyst and a phosphorus-containing solid flame retardant as the flame retardant,
the foamed polyurethane layer and the coating layer are adhered by a polyurethane hot melt adhesive containing a polyurethane prepolymer (I) obtained by using a polyol component (A) and a polyisocyanate component (B) as raw materials, and a catalyst (II),
the polyisocyanate component (B) in the polyurethane hot melt adhesive contains more than 0.5 mass % and 10 mass % or less of a carbodiimide-modified diphenylmethane diisocyanate based on the entire polyisocyanate component (B), and
the catalyst (II) includes a reactive catalyst having a functional group that reacts with an isocyanate group.

(2) In the laminate according to the above (1),
the reactive catalyst is preferably a catalyst having one of the functional group that reacts with an isocyanate group and having a tertiary amine structure.

(3) In the laminate according to the above (1) or (2),
the polyol component (A) preferably contains a crystalline polyester polyol (a-1) containing a condensation reaction product of an aliphatic dicarboxylic acid having 10 to 12 carbon atoms and an aliphatic diol having 4 to 6 carbon atoms, and a polyether polyol (a-2), and
a content of the polyether polyol (a-2) in the polyol component (A) is preferably 30 mass % to 80 mass % based on 100 mass % of the polyol component (A).

(4) In the laminate according to the above (3), it is preferable that the crystalline polyester polyol (a-1) has a number average molecular weight of 1,000 to 5,000, and the polyether polyol (a-2) has a number average molecular weight of 1,000 to 4,000.

(5) In the laminate according to any one of the above (1) to (4), it is preferable that the foamable polyurethane resin composition contains, as the flame retardant, the phosphorus-containing solid flame retardant and a melamine powder having an average particle diameter of 0.1 μm to 0.5 μm.

(6) In the laminate according to any one of the above (1) to (5), the phosphorus-containing solid flame retardant in the foamable polyurethane resin composition is preferably a phosphate ester compound.

(7) In the laminate according to any one of the above (1) to (6), the polyol component (A) of the polyurethane prepolymer (I) in the polyurethane hot melt adhesive preferably contains, as other polyols (a-3), one or more polyols selected from the group consisting of an amorphous polyester polyol, a polycarbonate polyol, and a low molecular weight diol having a number average molecular weight of 500 or less.

(8) In the laminate according to any one of the above (1) to (7), a surface layer is preferably adhered by the polyurethane hot melt adhesive to a surface of the foamed polyurethane layer opposite to a surface on which the coating layer is mounted.

A skin material for vehicle interior member of the present invention, which can solve the above problems, (9) uses the laminate according to the above (8).

Advantage of the Invention

According to the present invention, it is possible to provide a laminate and a skin material for vehicle interior member, which have a low VOC, good flame retardancy, and good thermal characteristics (particularly, moist heat resistance and thermal stability).

BRIEF DESCRIPTION OF DRAWINGS

FIG. 3 is a table showing configurations, thermal characteristics, flammability, VOC, and the like of Examples and Comparative Examples of the present invention.

MODES FOR CARRYING OUT THE INVENTION

Figure 1:
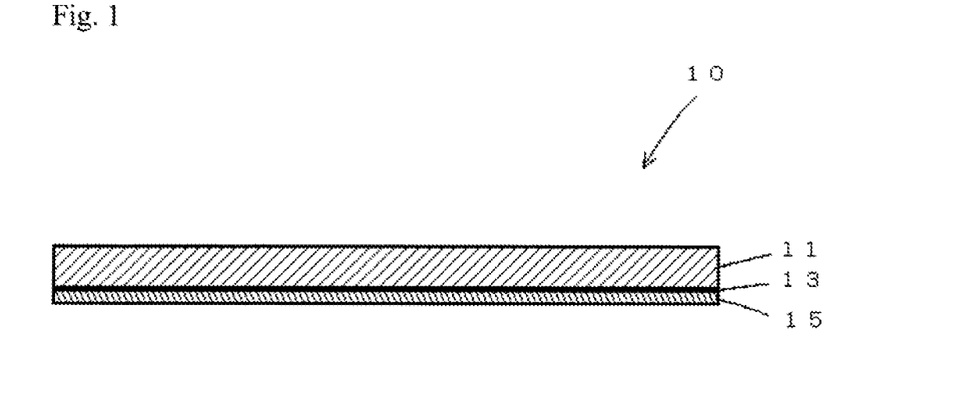
FIG. 1 is a cross-sectional view showing a laminate according to an embodiment of the present invention.

A laminate 10 according to an embodiment of the present invention, as shown in FIG. 1, includes a foamed polyurethane layer 11 and a coating layer 15 mounted on one surface of the foamed polyurethane layer 11.

The foamed polyurethane layer 11 is obtained by foaming a foamable polyurethane resin composition containing a polyol, a polyisocyanate, a foaming agent, a catalyst and a flame retardant.

As the polyol, a polyether polyol or a polyester polyol is used. Examples of the polyether polyol include a compound obtained by addition polymerization of a polyhydric alcohol with an alkyene oxide, polypropylene glycol and polytetramethylene glycol. As the polyhydric alcohol, glycerin, dipropylene glycol, trimethylolpropane and the like are used. As the alkylene oxide, ethylene oxide, propylene oxide and the like are used.

Examples of the polyether polyol include a trio obtained by addition polymerization of propylene oxide with glycerin, a triol obtained by addition polymerization of ethylene oxide with the above triol, and a diol obtained by addition polymerization of propylene oxide with dipropylene glycol.

The polyether polyol may be a polyether ester polyol obtained by reacting a polyoxyalkylene polyol with a polycarboxylic acid anhydride and a compound having a cyclic ether group. Examples of the polyoxyalkylene polyol include polyethylene glycol, polypropylene glycol, and a propylene oxide adduct of glycerin. Examples of polycarboxylic acid anhydride include anhydrides of succinic acid, adipic acid, phthalic acid and the like. Examples of the compound having a cyclic ether group (alkyene oxide) include ethylene oxide and propylene oxide. The polyether polyol is preferred because of having reactivity with polyisocyanates higher than that of the polyester polyol and not hydrolyzing.

As the polyester polyol, a condensed polyester polyol obtained by reacting a polycarboxylic acid such as adipic acid and phthalic acid with a polyol such as ethylene glycol, propylene glycol and glycerin, a lactone polyester polyol, and a polycarbonate polyester polyol are used.

As the polyisocyanate, an aliphatic or aromatic polyisocyanate having two or more isocyanate groups, a mixture thereof, and a modified polyisocyanate obtained by modifying the above can be used. Examples of the polyisocyanate include tolylene diisocyanate (TDI), 4,4'-diphenylmethane diisocyanate (MDI), polymethylene polyphenyl polyisocyanate, hydrogenated MDI, 1,5-naphthalenediisocyanate, 1,6-hexamethylene diisocyanate (HDI), isophorone diisocyanate, xylylene diisocyanate (XDI), hydrogenated XDI, tetramethyl xylene diisocyanate (TMXDI), 1,3,6-hexamethylene triisocyanate, 1,6,11-undecane triisocyanate, bicycloheptane triisocyanate, and modified products and derivatives thereof. Other prepolymers can also be used. The polyisocyanate may be used alone or in combination of two or more thereof.

The isocyanate index is preferably 80 to 110. When the isocyanate index is less than 80, it is difficult to obtain a foamed polyurethane layer 11 having good mechanical properties such as tensile strength and elongation. On the other hand, when the isocyanate index is more than 110, the flexibility of the foamed polyurethane layer 11 is lowered. The isocyanate index (INDEX) is a value obtained by multiplying the number of moles of the isocyanate group by 100 with respect to 1 mole of the active hydrogen group contained in a urethane raw material, and is calculated as [(isocyanate equivalent in foamable polyurethane resin composition/active hydrogen equivalent in foamable polyurethane resin composition)×100].

As the foaming agent, water, CFC substitutes or hydrocarbons such as pentane can be used alone or in combination. In the case of water, carbon dioxide gas is generated during the reaction between the polyol and the polyisocyanate, and the carbon dioxide gas causes foaming. The amount of water as the foaming agent is preferably about 2 parts by mass to 5 parts by mass based on 100 parts by mass of the polyol. In the case where another foaming agent is used together with water, the amount of the other foaming agent is appropriately determined.

As the catalyst, an active hydrogen group-containing tin ricinoleate is preferred, and the active hydrogen group-containing tin ricinoleate used in combination with an amine catalyst is more preferred. By containing the tin ricinoleate in the catalyst, the amount of the VOC in the foamed polyurethane layer 11 and the laminate 10 can be reduced. Examples of the amine catalyst include triethylamine, triethylenediamine, diethanolamine, dimethylaminomorpholine, N-ethylmorpholine, and tetramethylguanidine.

As the flame retardant, a phosphorus-containing solid flame retardant is used. The phosphorus-containing solid flame retardant is a compound having low volatility, and any of halogen-free compounds and halogen-containing compounds can be used, and a phosphate compound is used. Specially, triphenyl phosphate (white, flake), aromatic condensed phosphate ester (white powder to granular), tris (tribromoneopentyl)phosphate (white, crystalline, powder) and the like can be used. The content of the phosphorus-containing solid flame retardant is preferably 3 parts by mass to 15 parts by mass based on 100 parts by mass of the polyol. When the content of the phosphorus-containing solid flame retardant is less than 3 parts by mass, thee low flammability of the foamed polyurethane layer 11 cannot be sufficiently improved. On the other hand, when the content of the phosphorus-containing solid flame retardant is more than 15 parts by mass, there is a tendency that the balance of foaming is lost and it is difficult to obtain a good foamed polyurethane layer 11.

Examples of the phosphorus-containing flame retardant include a phosphorus-containing liquid flame retardant in addition to the phosphorus-containing solid flame retardant used in the present embodiment. However, since the phosphorus-containing liquid flame retardant is more volatile than the phosphorus-containing solid flame retardant, the amount of the VOC in the foamed polyurethane layer 11 and the laminate 10 increases.

It is preferable to use a melamine powder in combination with the phosphorus-containing solid flame retardant in the flame retardant of the present embodiment. Melamine [$C_3N_3(NH_2)_3$] does not contain oxygen, so that the progress of combustion can be prevented. The average particle diameter of the melamine powder is preferably 0.1 µm to 0.5 µm. Here, "average particle diameter" of melamine is calculated using a particle size distribution measuring device (for example, SALD-7000 (manufactured by Shimadzu Corporation)). Specifically, the weight average (average of a weight (volume) standard distribution) obtained by evaluating a dispersion liquid in which a sample is dispersed in a solvent (for example, ethyl acetate) using this device is the "average particle diameter". It is presumed that a fine melamine powder having an average particle diameter of 0.1 µm to 0.5 µm are dispersed in the foamed polyurethane layer 11 and melt when the foamed polyurethane layer 11 is burned to form a film, which cuts off oxygen and thus prevents the combustion. When the average particle diameter of the melamine powder is less than 0.1 µm, the production of the melamine powder is complicated and the production cost increases. On the other hand, when the average particle diameter of the melamine powder is more than 0.5 µm, the dispersibility of the melamine powder in the foamed polyurethane layer 11 is lowered, and the effect of improving the low flammability cannot be sufficiently achieved.

The content of the melamine powder is preferably 3 parts by mass to 13 parts by mass based on 100 parts by mass of the polyol. When the content of the melamine powder is less than 3 parts by mass, the effect of promoting the low flammability of the foamed polyurethane layer 11 cannot be sufficiently achieved. On the other hand, when the content of the melamine powder is more than 13 parts by mass, there is a possibility that the balance of foaming is easily lost, and it is not possible to obtain a good foamed polyurethane layer 11.

The density and thickness of the foamed polyurethane layer 11 are determined as appropriate. When the laminate 10 is used as a skin material for a vehicle interior member such as a vehicle seat cushion, in order to be able to bend along the surface of the vehicle interior member, for example, it is preferable that the density is about 20 kg/m$^3$ to 35 kg/m$^3$ and the thickness is about 3 mm to 10 mm.

The foamable polyurethane resin composition preferably contains, for example, a foam stabilizer as another additive. Examples of the foam stabilizer include silicone compounds, anionic surfactants such as sodium dodecylbenzenesulfonate and sodium laurate, polyether siloxanes, and phenolic compounds. The content of the foam stabilizer is, for example, 0.5 part by mass to 2.5 parts by mass based on 100 parts by mass of the polyol.

Examples of the other additives include known additives such as a filler, a stabilizer, a coloring agent, a plasticizer, and an antibacterial agent, if necessary.

The production of the foamed polyurethane layer 11 is performed by a known polyurethane foam production method. Examples of the known polyurethane foam production method include mold foaming method and slab foaming method. Mold foaming method is a method of filling a foamable polyurethane resin composition into a mold and foaming the foamable polyurethane resin composition in the mold. On the other hand, slab foaming method is a method of mixing a foamable polyurethane resin composition, discharging the mixture onto a belt conveyor, and foaming the mixture at atmospheric pressure and normal temperature. As the foamed polyurethane layer of the present embodiment, a slab foam obtained by cutting foamed polyurethane produced by slab foaming to a predetermined thickness is more preferred.

The coating layer 15 is preferably a nonwoven fabric, a woven fabric, or a knitted fabric. Particularly in the case of using a tricot among the knitted fabric as the coating layer 15 because of its elasticity and stretch property, when the laminate 11 is used as a skin material for a vehicle interior member, the laminate 11 is easily deformed along the surface of the vehicle interior member, and wrinkles are hardly generated in the skin material. Examples of the material of the coating layer 15 include nylon and polyester.

The foamed polyurethane layer 11 and the coating layer 15 are adhered by a polyurethane hot melt adhesive 13 containing a polyurethane prepolymer (I) obtained by using a polyol component (A) and a polyisocyanate component (B) as raw materials, and a catalyst (II). The polyurethane prepolymer (I) is a polyurethane prepolymer having an isocyanate group (NCO) at a terminal and obtained by using the polyol component (A) and the polyisocyanate (B) as raw materials to react the polyisocyanate (B) with the polyol component (A) in a stoichiometric excess.

Here, a hot melt adhesive composition that can be employed as the polyurethane hot melt adhesive 13 of the present embodiment will be specifically described in the following order. However, the present invention is not limited to the specific examples described here.

1 Component
2 Production method
3 Physical property
4 Use
5 Application method

<<<Component>>>

The hot melt adhesive composition according to the present embodiment is a low outgassing reactive urethane hot melt. The hot melt adhesive composition according to the present embodiment contains an isocyanate-terminated polyurethane prepolymer (I) as a base resin and a catalyst (II). Further, if necessary, other components may be contained in the adhesive composition.

When such a hot melt adhesive composition is used, the adhesiveness is exhibited when the polyurethane prepolymer heated to a molten state is cooled and solidified. Further, the uncured isocyanate terminal reacts with moisture in the air to form a crosslinked structure, whereby stronger adhesiveness is exhibited. Such a hot melt adhesive composition may be referred to as a moisture-curable hot melt adhesive composition, a reactive hot melt adhesive composition, or the like.

<<Polyurethane Prepolymer (I)>>

The polyurethane prepolymer (I) is obtained by using the polyol component (A) and the polyisocyanate component (B) as raw materials to generally react the polyisocyanate component (B) with the polyol component (A) in a stoichiometric excess.

<Polyol Component (A)>

The polyol component (A) is not particularly limited as long as it is generally used in the production of a polyurethane prepolymer, and preferably contains a polyester polyol and a polyether polyol. More specifically, a crystalline polyester polyol (a-1) containing a condensation reaction product of an aliphatic dicarboxylic acid having 10 to 12 carbon atoms and an aliphatic diol having 4 to 6 carbon atoms, and a polyether polyol (a-2) are preferably contained.

Examples of the aliphatic dicarboxylic acid having 10 to 12 carbon atoms include decanedioic acid (sebacic acid, C10), undecanedioic acid (C11), and dodecanedioic acid (C12). Examples of the aliphatic diol having 4 to 6 carbon atoms include butanediol (such as 1,3-butanediol or 1,4-butanediol), pentanediol (such as 1,5-pentanediol), and hexanediol (such as 1,6-hexanediol).

In the present embodiment, the "crystalline polyester polyol" indicates a polyester polyol having a melting point of 30° C. or higher, and the "amorphous polyester polyol" indicates a polyester polyol having a melting point of lower than 30° C. or a polyester polyol having no melting point. Such crystallinity can be adjusted by appropriately selecting the carboxylic acid and the alcohol constituting the polyester polyol. The melting point is defined as a temperature at which a melting peak appears in a temperature range of −80° C.→100° C. in a temperature program of 25° C.→−80° C.→100° C. (heating rate of 5° C./min) using a differential scanning calorimeter.

The number average molecular weight of the crystalline polyester polyol (a-1) is preferably in the range of 1,000 to 5,000, and more preferably in the range of 2,000 to 4,500. Here, the "number average molecular weight" is a value calculated from the hydroxyl value of the raw material. Other "number average molecular weights" described in the present description are values calculated in the same manner as described herein.

Examples of the polyether polyol (a-2) include polyethylene glycol, polypropylene glycol, and polytetramethylene ether glycol obtained by polymerizing cyclic ethers such as ethylene oxide, propylene oxide, and tetrahydrofuran, respectively, and copolyethers thereof. Further, the polyether polyol (a-2) obtained by polymerizing the above cyclic ethers using a polyhydric alcohol such as glycerin or trimethylolethane can also be used.

The number average molecular weight of the polyether polyol (a-2) is preferably in the range of 1,000 to 4,000, and more preferably in the range of 1,500 to 3,000.

Examples of the polyol other than the crystalline polyester polyol (a-1) and the polyether polyol (a-2) include one or more polyols (a-3) selected from the group consisting of an amorphous polyester polyol, a polycarbonate polyol and a low molecular weight diol having a number average molecular weight of 500 or less. The polyol component (A) may contain only the other polyols (a-3), but preferably contains the crystalline polyester polyol (a-1) and the polyether polyol (a-2) and further contains the polyol (a-3).

Examples of the amorphous polyester polyol include: polyester polyols obtained by a dehydration condensation reaction of aliphatic dicarboxylic acids (such as succinic acid, adipic acid, sebacic acid and azelaic acid), aromatic dicarboxylic acids (such as phthalic acid, terephthalic acid, isophthalic acid and naphthalenedicarboxylic acid), alicyclic dicarboxylic acids (such as hexahydrophthalic acid, hexahydroterephthalic acid and hexahydroisophthalic acid), or an ester or acid anhydride thereof with ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, or a mixture thereof; and polylactone diols obtained by ring-opening polymerization of lactone monomers such as ε-caprolactone and methylvalerolactone.

Examples of the polycarbonate polyol include a polycarbonate polyol obtained by reacting at least one polyhydric alcohol such as ethylene glycol, 1,2-propylene glycol, 1,3-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, and alicyclic dihydroxy compounds with diethylene carbonate, dimethyl carbonate, diethyl carbonate, or the like.

The low molecular weight diol is not particularly limited as long as it is a diol having a molecular weight of 500 or less, and examples thereof include ethylene glycol, propanediol, 2-methyl~1,3-propanediol, 2~butyl~2~ethyl-1,3~propanediol, 2,4-diethyl-1,5-pentanediol, and 2-ethyl-1,3-hexanediol.

The other polyols (a-3) can be used alone or in combination of two or more thereof. In addition, as the other polyols (a-3), a polyol other than the above may be contained.

<Polyisocyanate Component (B)>

The polyisocyanate (having a plurality of isocyanate groups) contained as the polyisocyanate component (B) will be described.

The polyisocyanate component (B) contains at least a carbodiimide-modified diphenylmethane diisocyanate (b-1) and a polyisocyanate other than the carbodiimide-modified diphenylmethane diisocyanate (other polyisocyanate (b-2)).

The carbodiimide-modified diphenylmethane diisocyanate (b-1) is a compound represented by the following formula.

[Chem. 1]

The other polyisocyanate (b-2) is not particularly limited, and examples thereof include tolylene diisocyanate (TDI), 4,4'-diphenylmethane diisocyanate (MDI), polymethylene polyphenyl polyisocyanate (polymeric MDI), hydrogenated MDI, 1,5-naphthalenediisocyanate, 1,6-hexamethylene diisocyanate (HDI), isophorone diisocyanate, xylylene diisocyanate (XDI), hydrogenated XDI, tetramethyl xylene diisocyanate (TMXDI), 1,8-diisocyanatomethyloctane, lysine ester triisocyanate, 1,3,6-hexamethylene triisocyanate, 1,6,11-undecane triisocyanate, bicycloheptane triisocyanate, and modified products and derivatives thereof.

The other polyisocyanate (b-2) preferably contains MDI (pure MDI).

The average number of functional groups (average number of isocyanate groups) of all polyisocyanates contained in the polyisocyanate component (B) is preferably 2.0 to 4.0, more preferably 2.0 to 3.0, still more preferably 2.0 to 2.5, even more preferably 2.0 to 2.3, and particularly preferably 2.0 to 2.1.

The average number of functional groups of all polyisocyanates contained in the polyisocyanate component (B) can be calculated based on a method disclosed in JP-A-H10-231347. For example, in the case of containing modified diphenylmethane diisocyanate and diphenylmethane diisocyanate (purified p-MDI, 4,4'-MDI), the average number of functional groups can be calculated according to the following equation 1 based on the measurement result of the NCO group content when the modified diphenylmethane diisocyanate and the diphenylmethane diisocyanate are measured to have the same ratio.

$$\frac{\text{MOLECULAR WEIGHT}(42.02) \text{ OF NCO}\% \times \text{AVERAGE NUMBER 1 OF FUNCTIONAL GROUP}}{\frac{\text{MOLECULAR WEIGHT OF } MDI \times \text{ADDITION RATE \% OF } MDI}{100} + \frac{\text{MOLECULAR WEIGHT OF CARBODIIMIDE-MODIFIED } MDI \times \text{ADDITION RATE \% } F \text{ CARBODIIMIDE-MODIFIED } MDI}{100}} = \frac{\text{NCO GROUP CONTENT \%}}{100}.$$
[Equation 1]

The NCO group content of the polyurethane prepolymer (I) is not particularly limited, and is preferably 1.0% to 2.5%. By being within such a range, it is possible to promote curing by moisture while preventing foaming and the like during the operation. The NCO group content is measured according to JIS K1603-1.

<Catalyst (II)>

The catalyst (II) includes a reactive catalyst having a functional group that reacts with an isocyanate group.

The functional group that reacts with the isocyanate group in the reactive catalyst is, for example, an active hydrogen group that reacts with the polyisocyanate, and is preferably at least one of a hydroxy group and an amino group.

The reactive catalyst is preferably a catalyst having one functional group that reacts with the isocyanate group and having a tertiary amine structure.

Examples of the reactive catalyst include: (1) amine catalysts having a hydroxy group as the functional group (such as N,N-dimethylaminohexanol, N,N-dimethylaminoethoxyethoxyethanol, N,N-dimethylaminoethoxyethanol,diethanolamine, and triethanolamine); and (2) amine catalysts having an amino group as the functional group (such as N,N,N'',N''-tetramethyldiethylenetriamine).

These reactive catalysts may be used alone or in combination of two or more thereof.

Further, the catalyst (II) may include a catalyst other than the reactive catalyst (for example, a metal catalyst or an amine catalyst having no functional group described above) as long as the effects of the present invention are not impaired.

<Other Components>

As other components, known additives used in hot melt adhesives, for example, oil components (plasticizers), tackifying resins, antioxidants, and wax, can be blended preferably within a range where the VOC is 150 ppm or less. In addition, a stabilizer, a filler, and the like may be blended.

Examples of the oil component include paraffin oil, naphthenic oil, and aromatic oil. Vegetable oil and the like may be used as the oil component.

Examples of the tackifying resin include one or more tackifying resins selected from the group consisting of an aliphatic petroleum resin, an aromatic petroleum resin, a hydrogenated aliphatic petroleum resin, a hydrogenated aromatic petroleum resin, a terpene resin, a styrene resin, a rosin resin, and modified resins thereof.

Examples of the antioxidant include phenolic antioxidants (such as Irganox 1010 (manufactured by BASF)), sulfur antioxidants (such as SUMILIZER TP-D (manufactured by Sumitomo Chemical Co., Ltd.)), and phosphorus antioxidants (such as Irgafos 168 (manufactured by BASF) and JP-650 (manufactured by Johoku Chemical Co., Ltd.)).

Examples of the wax include natural wax (for example, animal wax (such as beeswax and whale wax), plant wax (such as wood wax), petroleum wax (such as paraffin wax)) and synthetic wax (for example, synthetic hydrocarbons (such as low molecular weight polyethylene) and fatty acid esters (such as polyethylene glycol)).

These additives may be used alone or in combination of two or more thereof,

<<Content of Each Component>>

The content of the polyurethane prepolymer (I) is preferably 80 mass % to 99.99 mass % (more preferably 95 mass % to 99.99 mass %) based on the entire composition.

The content of the catalyst (II) varies depending on the type of the polyurethane prepolymer (I), and is preferably 0.01 mass % to 0.1 mass % (more preferably 0.01 mass % to 0.05 mass %) based on the entire composition.

When the polyol component (A) contains the crystalline polyester polyol (a-1) and the polyether polyol (a-2), the content of the crystalline polyester polyol (a-1) in the polyol component (A) is preferably 10 mass % to 60 mass %, and more preferably 20 mass % to 40 mass % based on the entire polyol component (A). By being within such a range, it is possible to maintain an appropriate solidification time and high peel strength.

The content of the polyether polyol (a~2) in the polyol component (A) is preferably 30 mass % to 80 mass %, and more preferably 40 mass % to 60 mass % based on the entire polyo component (A). By being within such a range, it is possible to achieve both high flexibility and peel strength.

The ratio of the content of the crystalline polyester polyol (a~1) to the content of the polyether polyol (a-2) in the polyol component (A) is preferably 20:80 to 70:30, and more preferably 30:70 to 50:50.

The content of the other polyols (a~3) in the polyol component (A) is preferably 30 mass % or less based on the entire polyol component (A). By being within such a range, it is possible to satisfy physical properties such as moist heat aging resistance and peel strength. The lower limit value is not particularly limited, and is, for example, 5 mass % or more based on the entire polyol component (A).

In the polyisocyanate component (B), the content of the carbodiimide-modified diphenylmethane diisocyanate (b-1) is more than 0.5 mass % and 10 mass % or less based on the entire polyisocyanate component (B). Further, this content is preferably 0.6 mass % or more and 10 mass % or less, more preferably 0.7 mass % or more and 10 mass % or less, still more preferably 0.8 mass % or more and 10 mass % or less, even more preferably 0.9 mass % or more and 10 mass % or less, and particularly preferably 1 mass % or more and 10 mass % or less, based on the entire polyisocyanate component (B). When the content of the carbodiimide-modified diphenylmethane diisocyanate (b-1) is within the above range, the modified group can improve the moist heat resistance and the thermal stability of the adhesive while preventing an increase in the viscosity of the composition. Among these, the content of the carbodiimide-modified diphenylmethane diisocyanate (b-1) is preferably 1 mass % or more and 10 mass % or less based on the entire polyisocyanate component (B).

The other polyisocyanate (b-2) preferably include MDI (pure MDI) in an amount of 50 mass % or more, 80 mass % or more, 90 mass % or more, 95 mass % or more, 99 mass % or more or 100%, based on the entire of the other polyisocyanate (b-2).

<<<Production Method>>>

The method for producing the urethane hot melt adhesive composition according to the present embodiment may be a known method, and is not particularly limited as long as the produced urethane hot melt adhesive composition does not impair the purpose of the present invention. For example, the urethane hot melt adhesive composition can be produced as follows. (1) A predetermined amount of a polyisocyanate is dropped into a reaction vessel containing a predetermined amount of a polyol, and then heating is performed. The isocyanate group of the polyisocyanate is reacted with the hydroxy group of the polyol in a stoichiometric excess, so as to prepare the polyurethane prepolymer (I). (2) A predetermined amount of other components containing the catalyst (II) is dropped into the polyurethane prepolymer (I) and stirred to produce a desired urethane hot melt adhesive composition.

The reaction is carried out, for example, at a temperature of 50° C. to 120° C. and preferably 60° C. to 100° C. The reaction time is, for example, 1 to 15 hours.

<<<Physical Property>>>

Next, the physical property of the hot melt adhesive composition according to the present embodiment will be described.

<<VOC>>

In the hot melt adhesive composition according to the present embodiment, the amount of the organic volatile component generated when being heated at 90° C. is preferably 150 ppm or less in terms of toluene. When the amount of the VOC is within this range, the regulation value can be satisfied for all products of the vehicle seat.

<<Moist Heat Resistance>>

The hot melt adhesive composition according to the present embodiment preferably has, as the moist heat resistance, a moist heat resistance of 400 hours or longer when allowed to stand in a moist heat environment (80° C. and 95%), which is evaluated as a time during which a peel strength of 80% or more of the normal peel strength can be maintained.

<<Thermal Stability 1 (Storage Stability): Medium Temperature and Long Term Thermal Stability>>

The hot melt adhesive composition according to the present embodiment preferably has a storage stability of 80% or more when allowed to stand at 50° C. for 3 months while being sealed in an aluminum bag, which is evaluated as residual rate of NCO % (NCO % after standing/NCO % before standing×100).

<<Thermal Stability 2: High Temperature and Short Term Thermal Stability>>

The hot melt adhesive composition according to the present embodiment preferably has a thermal stability of 200% or less in a nitrogen atmosphere at 140° C., which is evaluated as a viscosity increase rate (viscosity after test/viscosity before test×100) of the hot melt adhesive composition heated for 4 hours.

<Measurement Method>

A rotor No. 4 connected to a Brookfield digital viscometer LVDV-I+ manufactured by Brookfield Company is placed into 150±15 g of a sample heated and melted at 140° C. in a cylindrical glass container, and the viscosity can be measured. The viscosity before the test is the viscosity after 0 hours, and the viscosity after the test is the viscosity after 4 hours.

<<Normal Peel Strength>>

The hot melt adhesive composition according to the present embodiment preferably has a normal peel strength of 3 N/25 mm or more, which is evaluated as peel strength one day after laminating a urethane foam and a skin material.

<<<Use>>>

The hot melt adhesive composition according to the present embodiment is a reactive hot melt adhesive composition capable of laminating and adhering a skin material and a base material. Particularly when the hot melt adhesive composition is formed into a specific fibrous shape to be described later, an adhesive layer (a layer containing a cured hot melt adhesive composition) having excellent texture, air permeability, and anti-infiltration property is formed. Therefore, the skin material and the base material can be applied regardless of the type, such as resin foam, resin film, synthetic leather, natural leather, woven fabric or nonwoven fabric. In addition, since the base material is also applicable to a urethane resin foam, the hot melt adhesive composition can also be used for vehicle members (particularly for vehicle interiors) which are difficult to apply to long products where a base material and a skin material which are made of a continuous sheet are laminated and adhered, or which are difficult to apply with ordinary thermoplastic hot melt adhesives.

<<<Application Method>>>

Next, an example of a method of applying the hot melt adhesive composition according to the present embodiment will be described. In this example, a case where the hot melt adhesive composition is coated to form a predetermined adhesive layer using a non-contact method (for example, a spray method) will be described. However, the method of applying the hot melt adhesive composition according to the present embodiment is not limited to this, and the hot melt adhesive composition may be applied to the surface to be adhered by a known method.

<<Melting Step>>

First, the hot melt adhesive composition according to the present embodiment is heated and held in a molten state (melting step). Generally, in the melting step, it is necessary to make the atmosphere moisture-free.

<<Coating Step>>

Next, the hot melt adhesive composition in a molten state is coated to a surface to be adhered (preferably, the surface of the foam) of an object to be adhered by an appropriate coating method (preferably, a non-contact coating method). The specific shape during the coating is not particularly limited, and, for example, may be a line shape, a dot shape, or a fiber shape, to form an adhesive layer. Alternatively, the adhesive layer may be formed in a sheet shape. In the adhesive layer may, the coating amount of the adhesive composition is preferably 5 g/m$^2$ to 50 g/m$^2$ (more preferably 10 g/m$^2$ to 30 g/m$^2$). The adhesive composition may be coated to both surfaces to be adhered.

Specific coating conditions are not particularly limited. For example, when a non-contact coating method is used as described above, the coating may be performed at a pressure of 0.01 MPa to 0.4 MPa and a temperature of 100° C. to 160° C.

Here, the non-contact coating method is a method of coating the adhesive composition without the coating device being into contact with the member to be adhered, and includes, for example, a spray coating method.

Before the coating step, a known pretreatment (for example, a primer treatment, a corona treatment, or a plasma treatment) may be performed on the surface to be adhered.

<<Contact Step and Curing Step>>

After the coating step, another member is brought into contact with the surface to be adhered (coated surface) with the adhesive layer, and the hot melt adhesive composition is cooled and cured. Generally, as described above, after cooling and curing, the uncured isocyanate terminal reacts with moisture in the air to form a crssinked structure, whereby stronger adhesiveness is exhibited.

When the hot melt adhesive composition according to the present embodiment is coated by the method described in the coating step, the hot melt adhesive composition can be adhered regardless of the object to be adhered. Specifically, regardless of a resin foam, a resin film, synthetic leather, natural leather, a woven fabric or a nonwoven fabric, the texture, air permeability and adhesiveness are excellent, and infiltration into the object to be adhered can be prevented. Particularly, even when the object to be adhered is a urethane resin foam, such an effect is exhibited.

In this way, a laminate having an adhesive layer which is a cured product of the hot melt adhesive composition according to the present embodiment, particularly, a laminate having a foam and an adhesive layer provided on the surface of the foam is obtained. As a specific configuration, the laminate is preferably a laminate including a urethane foam, as a base material, and a skin material and a backing fabric. Such a laminate is preferably usable as a vehicle interior member, that is, a base material (laminated material (laminated sheet) in which a skin layer is adhered to the surface of a laminated sheet having a backing fabric layer formed on the back surface of a buffer layer containing a foam).

Here, the laminate 10 of the present embodiment will be described with reference to FIG. 1 again. The production of the laminate 10 is performed by coating a predetermined amount of the polyurethane hot melt adhesive 13 to one surface of the foamed polyurethane layer 11 or the coating layer 15 or both, thereafter overlapping the one surface of the foamed polyurethane layer 11 and the coating layer 15, and cooling and curing the polyurethane hot melt adhesive 13 in this state.

The method of coating the polyurethane hot melt adhesive 13 may be either a non-contact method such as spray coating or a contact method such as roll coater coating. The coating amount of the polyurethane hot melt adhesive 13 is preferably 5 g/m$^2$ to 50 g/m$^2$, and more preferably 10 g/m$^2$ to 30 g/m$^2$. As conditions for the non-contact method, a pressure of 0.01 MPa to 0.4 MPa and a temperature of 100° C. to 160° C. are exemplified.

After the polyurethane hot melt adhesive 13 is cooled and cured, the uncured terminal isocyanate in the polyurethane prepolymer (I) reacts with moisture in the air to form a crosslinked structure, thereby exhibiting stronger adhesive strength.

Figure 2:
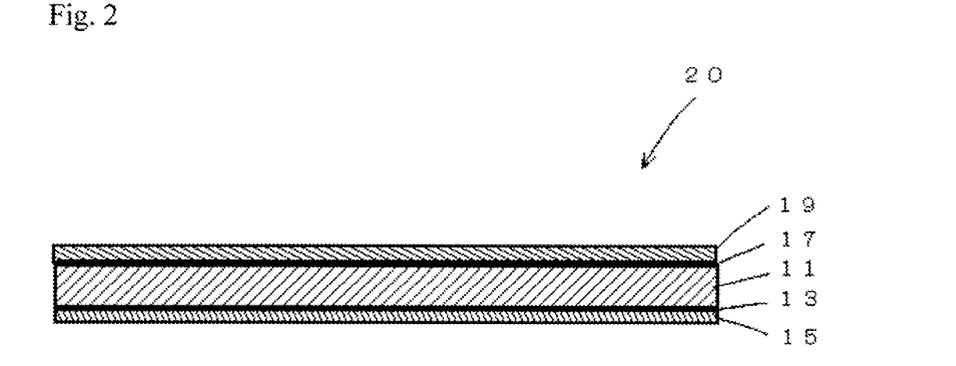
FIG. 2 is a cross-sectional view showing a laminate according to another embodiment of the present invention.

A laminate 20 according to another embodiment shown in FIG. 2 includes the foamed polyurethane layer 11, the coating layer 15 mounted on one surface of the foamed polyurethane layer 11, and a surface layer 19 mounted on a surface of the foamed polyurethane layer 11 opposite to the surface on which the coating layer 15 is mounted. The coating layer 15 and the foamed polyurethane layer 11 are adhered by the polyurethane hot melt adhesive 13, and the surface layer 19 and the foamed polyurethane layer 11 are adhered by a polyurethane hot melt adhesive 17. The polyurethane hot melt adhesives 13 and 17 are the same as the hot melt adhesive 13 described for the laminate 10 in FIG. 1.

The surface layer 19 is made of an appropriate material such as natural leather, synthetic leather, and fabric (plastic-lined product).

The production of the laminate 20 can be performed by the following method. First, similar to the laminate 10 in FIG. 1, one surface of the foamed polyurethane layer 11 and the coating layer 15 are adhered by the polyurethane hot melt adhesive 13. Thereafter, a predetermined amount of the polyurethane hot melt adhesive 17 is coated to the other surface of the foamed polyurethane layer 11 or the surface layer 19 or both. Thereafter, the surface of the foamed polyurethane layer 11 and the surface layer 19 are overlapped, and the polyurethane hot melt adhesive 17 is cooled and cured in this state. Accordingly, the laminate 20 can be obtained. After the polyurethane hot melt adhesive 17 is cooled and cured, the uncured terminal isocyanate in the polyurethane prepolymer reacts with moisture in the air to form a crosslinked structure, thereby exhibiting stronger adhesive strength. Alternatively, the surface layer 19 may be firstly adhered to one surface of the foamed polyurethane layer 11 by the polyurethane hot melt adhesive 17 and thereafter the coating layer 15 may be adhered to the opposite surface of the foamed polyurethane layer 11 by the polyurethane hot melt adhesive 13.

The laminate 20 is suitable as a skin material for a vehicle interior member such as a vehicle seat cushion, a headrest, or an instrument panel. The vehicle interior member includes, as constituent components, a cushion member made of foamed polyurethane or the like, and a skin material is covered on the surface of the cushion member. When the laminate 20 is used as a skin material for a vehicle interior member, a plurality of laminate pieces obtained by cutting the laminate 20 into a predetermined size are sewn to make the surface layer 19 as a front side, thereby forming a shape to cover the vehicle interior member.

EXAMPLES

Next, the present invention will be described in more detail with reference to Examples and Comparative Examples, but the present invention is not limited thereto.

[Example a According to Urethane Rot Melt Adhesive Composition]

<<<Production of Urethane Hot Melt Adhesive Composition>>>

Hereinafter, a method for producing the polyurethane hot melt adhesive composition according to each Example and each Comparative Example will be described.

Example A1

The polyol component (A) was charged into a reactor, the polyisocyanate component (B-1) was added thereto, and the mixture was reacted at 100° C. for 3 to 4 hours. Then, an OH group-containing tertiary amine catalyst was added thereto and reacted for an additional hour to obtain a polyurethane hot melt adhesive composition containing a urethane prepolymer having an NCO group content of 2.0%. The blending amount of each component is: 80 parts by mass of the polyol component (A), 20 parts by mass of the polyisocyanate component (B-1), and 0.03 part by mass of the amine catalyst.

| <Polyol Component (A)> | |
|---|---|
| Crystalline polyester polyol (sebacic acid/butanediol), melting point 60° C. | |
| Number average molecular weight of 4000 | 40 parts by mass |
| Polypropylene glycol addition type: PO alone | |
| Number average molecular weight of 2000 | 50 parts by mass |
| Polycarbonate diol | |
| Number average molecular weight of 1000 | 10 parts by mass |

| <Polyisocyanate Component (B-1)> | |
|---|---|
| Diphenylmethane diisocyanate (MDI) | 99 parts by mass |
| Carbodiimide-modified MDI | 1 part by mass |

Example A2

A polyurethane hot melt adhesive composition according to Example A2 was produced in the same manner as in Example A1, except that the polyisocyanate component (B-1) was changed to the polyisocyanate component (B-2).

| <Polyisocyanate Component (B-2)> | |
|---|---|
| Diphenylmethane diisocyanate (MDI) | 90 parts by mass |
| Carbodiimide-modified MDI | 10 parts by mass |

Comparative Example A1

A polyurethane hot melt adhesive composition according to Comparative Example A1 was produced in the same manner as in Example A1, except that the polyisocyanate component (B-1) was changed to the polyisocyanate component (B-3).

| <Polyisocyanate Component (B-3)> | |
|---|---|
| Diphenylmethane diisocyanate (MDI) | 100 parts by mass |

Comparative Example A2

A polyurethane hot melt adhesive composition according to Comparative Example A2 was produced in the same manner as in Example A1, except that the OH group-containing tertiary amine catalyst was changed to a high molecular weight tertiary amine catalyst (main component: N,N'-dimethyldodecylamine).

Comparative Example A3

A polyurethane hot melt adhesive composition according to Comparative Example A3 was produced in the same manner as in Example A1, except that the polyisocyanate component (B-1) was changed to the polyisocyanate component (B-4).

| <Polyisocyanate Component (B-4)> | |
|---|---|
| Diphenylmethane diisocyanate (MDI) | 99.5 parts by mass |
| Carbodiimide-modified MDI | 0.5 part by mass |

Comparative Example A4

A polyurethane hot melt adhesive composition according to Comparative Example A4 was produced in the same manner as in Example A1, except that the polyisocyanate component (B-1) was changed to the polyisocyanate component (B-5).

| <Polyisocyanate Component (B-5)> | |
|---|---|
| Diphenylmethane diisocyanate (MDI) | 89 parts by mass |
| Carbodiimide-modified MDI | 11 parts by mass |

<<<Evaluation>>>

Next, each of the hot melt adhesive compositions obtained above was specifically evaluated by the following method. The evaluation results are shown in Table 1.

<<<VOC>>

The hot melt adhesive was directly put into a glass tube of a heating and desorption apparatus (TD-100 manufactured by Markes Co. Ltd.), and the outgas was measured by GC/MS (GC/MS (6890/5973) manufactured by Agilent Technologies). The sample was heated at 90° C. for 30 minutes, and up to C20 was calculated in terms of toluene. A case where the measurement result was 150 ppm or less was determined to be passed.

<<Moist Heat Resistance>>

The hot melt adhesive melted at 140° C. was spray-coated at a rate of 20 g/m² to a urethane foam (150×25×5 mm) with a hand gun (manufactured by Reka Klebetechnik), and the skin material was pressed. Three days later, the sample was allowed to stand under an environment of 80° C. and 95%, and the peel strength was measured every 100 hours. The measurement was made up to a time when 80% of the normal peel strength could be maintained. A case where the measurement result was 400 hours or longer was determined to be passed. The normal peel strength was measured by the following method.

<Normal Peel Strength>

The hot melt adhesive melted at 140° C. was spray-coated at a rate of 20 g/m² to a urethane foam (150×25×5 mm) with a hand gun (manufactured by Reka Klebetechnik), and the skin material was pressed. One day later, the peel strength was measured at a tensile speed of 200 mm/min using an autograph (AG-Xplus manufactured by Shimadzu Corporation). A median of N =3 of a numerical value obtained by averaging the peel strengths at three points of each the maximum value and the minimum value was calculated as the normal peel strength.

<<Storage Stability>>

The hot melt adhesive (12.5 g) was put into an aluminum bag (volume 110 cc), and allowed to stand at 50° C. for 3 months in a sealed state, and the reduction rate of NCO % was measured. A case where the measurement result was 80% or more was determined to be passed.

<<Thermal Stability>>

After heating the hot melt adhesive at 140° C. in a nitrogen atmosphere for 4 hours, the 15 rate of increase in viscosity of the hot melt adhesive was measured. A case where the measurement result was 200% or less was determined to be passed.

TABLE 1

| | VOC ppm | Moist heat resistance h | Storage stability % | Thermal stability % | Determination |
|---|---|---|---|---|---|
| Example A1 | 10 | 600 | 95 | 150 | ○ |
| Example A2 | 10 | 600 | 90 | 200 | ○ |
| Comparative Example A1 | 10 | 300 | 95 | 150 | x |
| Comparative Example A2 | 120 | 300 | 85 | 400 | x |
| Comparative Example A3 | 10 | 300 | 90 | 400 | x |
| Comparative Example A4 | 10 | 600 | 85 | 430 | x |
| Target value | ≤150 | ≥400 | ≥80 | ≤200 | |

[Example B According to Laminate]

Using the following raw materials, foamable polyurethane resin compositions having the compositions of each Example and each Comparative Example shown in FIG. 3 were prepared. After slab foaming, foamed polyurethane layers of Example B1, Example B2 and Comparative Examples B1 to B12 were produced by cutting to a thickness of 5 mm. The numerical values of the raw materials in the foamable polyurethane resin composition column in FIG. 3 are parts by mass.

Polyol: polyether polyol, functional group number: 3, molecular weight: 3000, hydroxyl value: 56 mgKOH/g, product name: GP3050NS, manufactured by Sanyo Chemical Industries, Ltd.

Flame retardant 1: melamine powders, average particle diameter: 0.3 μm, product name: Melamine, manufactured by Mitsui Chemicals, Inc.

Flame retardant 2: phosphorus-containing solid flame retardant, aliphatic phosphoramidate, product name: DAIG-URD-850, manufactured by Daihachi Chemical Industry Co., Ltd.

Flame retardant 3: phosphorus-containing liquid flame retardant, condensed phosphate ester, product name: DAIG-URD-880, manufactured by Daihachi Chemical Industry Co., Ltd.

Foaming agent: water

Foam stabilizer: silicone foam stabilizer, product name: B-8244, manufactured by Evonik Amine catalyst: N,N-dimethylaminohexanol, product name: No. 25, manufactured by Kao Corporation Metal catalyst 1: active hydrogen group-containing tin ricinoleate, product name: KOSMOSEF, manufactured by Evonik Metal catalyst 2: stannous octylate, manufactured by Johoku Chemical Co., Ltd.

Polyisocyanate: TDI (mixture of 80% of 2,4-TDI and 20% of 2,6-TDI), product name: Coronate T-80, manufactured by Tosoh Corporation The density (apparent density, based on JIS K 7222), tensile strength (based on JIS K 6700-5 3), and elongation (based on JIS K 6400-5 3) were measured for the foamed polyurethane layer of each of Examples and Comparative Examples.

A coating layer was adhered to one surface of the foamed polyurethane layer of Example B1 by a hot melt adhesive 6, to produce a laminate of Example B1. The coating layer was nylon tricot 15d, manufactured by Kiryutricot, Inc., and was spray-coated with the hot melt adhesive 6 in a coating amount of 20 g/m².

As the polyurethane hot melt adhesive 6, the polyurethane hot melt adhesive composition produced in Example A1 described above was used.

A coating layer was adhered to one surface of the foamed polyurethane layer of Example B2 by a hot melt adhesive 7, to produce a laminate of Example B2. The coating layer was nylon tricot 15d, manufactured by Kiryutricot, Inc., and was spray-coated with the hot melt adhesive 7 in a coating amount of 20 g/m².

As the polyurethane hot melt adhesive 7, the polyurethane hot melt adhesive composition produced in Example A2 described above was used.

A coating layer was adhered to one surface of each of the foamed polyurethane layers of Comparative Example B1 to B3 and Comparative Examples B7 to B10 by a polyurethane hot melt adhesive 1, to produce laminates of Comparative Example B1 to B3 and Comparative Examples B7 to B10. The coating layer was nylon tricot 15d, manufactured by Kiryutricot, Inc., and was spray-coated with the polyurethane hot melt adhesive 1 in a coating amount of 20 g/m².

As the polyurethane hot melt adhesive 1, the following polyol component (A) was charged into a reaction vessel, a polyisocyanate and an amine catalyst were added thereto, and the mixture was reacted at 100° C. for 3 to 4 hours to produce a polyurethane prepolymer having NCO % of 2.0%, so as to obtain the polyurethane hot melt adhesive 1.

(Polyurethane Hot Melt Adhesive 1)

Polyol Component (A)

Crystalline polyester polyol (a-1): sebacic acid/butanediol, melting point: 60° C., number average molecular weight: 4000, 35 parts by mass Polyether polyol (a-2): polypropylene glycol (addition type PO alone), number average molecular weight: 2000, 50 parts by mass Other polyol (a-3): amorphous polyester polyol, phthalic acid/neopentyl glycol, number average molecular weight: 1000, 15 parts by mass Polyisocyanate (B)
  Diphenylmethane diisocyanate, NCO %=33%, 24 parts by mass
Amine catalyst: N,N-dimethyldodecylamine, 0.05 part by mass A coating layer was adhered to one surface of the foamed polyurethane layer of Comparative Example B4 by a polyurethane hot melt adhesive 2, to produce a laminate of Comparative Example B4. The coating layer was nylon tricot 15d, manufactured by Kiryutricot. Inc., and was spray-coated with the polyurethane hot melt adhesive 2 in a coating amount of 20 g/m².

As the polyurethane hot melt adhesive 2, the following polyol component (A) was charged into a reaction vessel, a polyisocyanate and an amine catalyst were added thereto, and the mixture was reacted at 100° C. for 3 to 4 hours to produce a polyurethane prepolymer having NCO % of 2.0%, so as to obtain the polyurethane hot melt adhesive 2.

(Polyurethane Hot Melt Adhesive 2)
Polyol component (A)
  Crystalline polyester polyol (a-1): dodecanedioic acid/hexanediol, melting point: 70° C., number average molecular weight: 4000, 35 parts by mass
  Polyether polyol (a-2): polypropylene glycol (addition type PO alone), number average molecular weight: 2000, 50 parts by mass
  Other polyol (a-3): polycarbonate diol (addition type PO alone), melting point: 50° C. number average molecular weight: 1000, 15 parts by mass
Polyisocyanate (B)
  Diphenylmethane diisocyanate, NCO %=33%, 24 parts by mass
Amine catalyst: N,N-dimethyldodecylamine, 0.05 part by mass A coating layer was adhered to one surface of the foamed polyurethane layer of Comparative Example B5 by a polyurethane hot melt adhesive 3, to produce a laminate of Comparative Example B5. The coating layer was nylon tricot 15d, manufactured by Kiryutricot, Inc., and was spray-coated with the polyurethane hot melt adhesive 3 in a coating amount of 20 g/m².

As the polyurethane hot melt adhesive 3, the following polyol component (A) was charged into a reaction vessel, a polyisocyanate and an amine catalyst were added thereto, and the mixture was reacted at 100° C. for 3 to 4 hours to produce a polyurethane prepolymer having NCO % of 2.0%, so as to obtain the polyurethane hot melt adhesive 3.

(Polyurethane Hot Melt Adhesive 3)
Polyol component (A)
  Crystalline polyester polyol (a-1): dodecanedioic acid/hexanediol, melting point: 70° C., number average molecular weight: 4000, 35 parts by mass
  Polyether polyol (a-2): polypropylene glycol (addition type PO alone), number average molecular weight: 2000, 50 parts by mass
  Other polyol (a-3): butylethylpropanediol (addition type PO alone), melting point: 43° C., 15 parts by mass
Polyisocyanate (B)
  Diphenylmethane diisocyanate, NCO %=33%, 40 parts by mass
Amine catalyst: N,N-dimethyldodecylamine, 0.05 part by mass A coating layer was adhered to one surface of the foamed polyurethane layer of Comparative Example B6 by a polyurethane hot melt adhesive 4, to produce a laminate of Comparative Example B6. The coating layer was nylon tricot 15d, manufactured by Kiryutricot, Inc., and was spray-coated with the polyurethane hot melt adhesive 4 in a coating amount of 20 g/m².

As the polyurethane hot melt adhesive 4, the following polyol component (A) was charged into a reaction vessel, a polyisocyanate and an amine catalyst were added thereto, and the mixture was reacted at 100° C. for 3 to 4 hours to produce a polyurethane prepolymer having NCO % of 2.0%, so as to obtain the polyurethane hot melt adhesive 4.

(Polyurethane Hot Melt Adhesive 4)
Polyol component (A)
  Crystalline polyester polyol (a-1): sebacic acid/hexanediol, melting point: 65° C., number average molecular weight: 4000, 20 parts by mass
  Polyether polyol (a-2): polypropylene glycol (addition type PO alone), number average molecular weight: 2000, 80 parts by mass
Polyisocyanate (B)
  Diphenylmethane diisocyanate, NCO %=33%, 18 parts by mass
Amine catalyst: N,N-dimethyldodecylamine, 0.05 part by mass A coating layer (nylon tricot 15d, manufactured by Kiryutricot, Inc.) was adhered to the foamed polyurethane layer of Comparative Example B11 by frame lamination, to produce a laminate of Comparative Example B11.

A coating layer was adhered to the foamed polyurethane layer of Comparative Example B12 by a polyurethane hot melt adhesive 5, to produce a laminate of Comparative Example B12. The coating layer was nylon tricot 15d, manufactured by Kiryutricot, Inc., and was spray-coated with the polyurethane hot melt adhesive 5 in a coating amount of 20 g/m².

As the polyurethane hot melt adhesive 5, a crystalline polyester polyol (adipic acid/butanediol, melting point: 58° C., number average molecular weight: 2000, 30 parts by mass) and polypropylene glycol (number average molecular weight: 1000, 70 parts by mass) as polyol components were charged into a reaction vessel, diphenylmethane diisocyanate (NCO %=33%, 20 parts by mass) and an amine catalyst (N,N-dimethyldodecylamine, 0.05 part by mass) as polyisocyanates were added thereto, and the mixture was reacted at 100° C. for 3 to 4 hours to produce a polyurethane prepolymer having NCO % of 2.0%, so as to obtain the polyurethane hot melt adhesive 5.

The flammability, VOC value, FOG value, TVOC value, moist heat resistance, storage stability, and thermal stability were evaluated for the laminates of Example B1, Example B2 and Comparative Examples B1 to B12.

The flammability was measured based on FMVSS302. For the determination of the flammability, a case where the flame goes out within a burning distance of 51 mm and within 60 seconds is evaluated as "self-extinguishing", a case where the test piece does not ignite or the flame goes out just before the A mark is evaluated as "non-flanmable", and a case where the burning speed is 102 mm/min or less is evaluated as "passed". The flame retardancy increases in the order of "passed"→"self-extinguishing"→"non-flammable", and "non-flammable" has the highest flame retardancy.

For the measurement of the VOC value, a test piece (with a coating layer) of 7 mg was prepared from each of the laminates of Example B1, Example B2, and Comparative Examples B1 to B12, the test piece was put into a glass tube, and a VOC measurement method specified in "German Association of the Automotive Industry VDA278" was performed using a heating and desorption apparatus (product name: TDSA (including KAS. KAS-3+, and KAS-4), manufactured by Gestel K.K). Specifically, each test piece was heated at a temperature of 90° C. for 30 minutes, and the gas generated during the heating was analyzed by a gas chromatograph mass spectrometer (product name: gas chromatograph mass spectrometer (product number: 6890-5973N), manufactured by Agilent Technologies) to calculate the VOC value. In addition, according to the rules of "German Association of the Automotive Industry VDA278", subsequent to the measurement of the VOC value, heating was performed under the conditions of a temperature of 120° C. and a time of one hour, and the gas generated during the heating was similarly analyzed by a gas chromatograph mass spectrometer to calculate the FOG value. FOG is a phenomenon in which volatile substances adhere to glass and become white and cloudy.

The TVOC value was the total emission amount of the volatile organic compound, and was measured based on PV-3341. Specifically, heating was performed under the conditions of a temperature of 120° C. and a time of 5 hours, and the gas generated during the heating was calculated based on a peak area obtained by analyzing the gas using gas chromatography.

In addition, VOC and the like were evaluated. As the evaluation criteria, a case where VOC<100 ppm, FOG<250 ppm, and TVOC<30 µgC/g were satisfied was evaluated as "○", and a case where any one of the above was not satisfied was evaluated as "X".

The moist heat resistance of the polyurethane hot melt adhesive used in each of Examples and Comparative Examples was evaluated according to the following method. Three days after the laminate was prepared, the laminate was allowed to stand under an environment of 80° C. and 95%, and the peel strength was measured every 100 hours. The measurement was made up to a time when 80% of the normal peel strength could be maintained. A case where the measurement result was 400 hours or longer was determined to be passed. The normal peel strength was measured by the following procedure. One day after the laminate was prepared, the peel strength was measured at a tensile speed of 200 mm/min using an autograph (AG-Xplus manufactured by Shimadzu Corporation). A median of N=3 of a numerical value obtained by averaging the peel strengths at three points of each the maximum value and the minimum value was calculated as the normal peel strength.

The storage stability of the polyurethane hot melt adhesive used in each of Examples and Comparative Examples was evaluated according to the following method. The hot melt adhesive (12.5 g) was put into an aluminum bag (volume 110 cc), and allowed to stand at 50° C. for 3 months in a sealed state, and the reduction rate of NCO % was measured. A case where the measurement result was 80% or more was determined to be passed.

The thermal stability of the polyurethane hot melt adhesive used in each of Examples and Comparative Examples was evaluated according to the following method. After heating the hot melt adhesive at 140° C. in a nitrogen atmosphere for 4 hours, the rate of increase in viscosity of the hot melt adhesive was measured. A case where the measurement result was 200% or less was determined to be passed.

Further, comprehensive evaluation was performed on the laminates of Example B1, Example B2, and Comparative Examples B1 to B12. As criteria of the comprehensive evaluation, when the determination of the flammability was non-flammable, the evaluation of the VOC and the like was "○", and the evaluation of the moist heat resistance and the like was "○", the comprehensive evaluation was "○"; when the determination of the flammability was non-flammable and the evaluation of the VOC and the like was "○", but the evaluation of the moist heat resistance and the like was "X", the comprehensive evaluation was "Δ"; and when the determination of the flammability was not non-flammable or the evaluation of the VOC and the like was "X", the comprehensive evaluation was "X".

"–" in the FOG and TVOC result columns in FIG. 3 means not measured.

Example B1

The foamed polyurethane layer of Example B1 is obtained from a foamable polyurethane resin composition containing 100 parts by mass of a polyol, 4 parts by mass of the flame retardant 1 (melamine powder), 4 parts by mass of the flame retardant 2 (phosphorus-containing solid flame retardant), 3.95 parts by mass of a foaming agent (water), 1.1 parts by mass of a foam stabilizer, 0.18 part by mass of an amine catalyst, and 1.3 parts by mass of the metal catalyst 1 (active hydrogen group-containing tin ricinoleate), and having an isocyanate index of 103. The foamed polyurethane layer of Example B1 has a density of 25.7 kg/m$^3$, a tensile strength of 90 kPa, and an elongation of 216%.

The laminate of Example B1 is obtained by adhering a coating layer to one surface of a foamed polyurethane layer by the polyurethane hot melt adhesive 6, in which the burning distance is 0 mm and the determination of the flammability is "non-flammable"; the VOC value is 70 ppm, the FOG value is 31 ppm, the TVOC value is 13 µgC/g and the evaluation of the VOC and the like is "○"; the evaluation of the moist heat resistance is "○"; the evaluation of the storage stability is "○"; the evaluation of the thermal stability is "○"; and the comprehensive evaluation is "○". The laminate of Example B1 has a low VOC, good flame retardancy and good thermal characteristics.

Example B2

The foamed polyurethane layer of Example B2 is obtained from the same foamable polyurethane resin composition as in Example B1, and the physical property values are the same as those of the foamed polyurethane layer of Example B1. The laminate of Example B2 is obtained by adhering a coating layer to one surface of a foamed polyurethane layer by the polyurethane hot melt adhesive 7, in which the burning distance is 0 mm and the determination of the flammability is "non-flammable"; the VOC value is 72 ppm, the FOG value is 30 ppm, the TVOC value is 13 µgC/g, and the evaluation of the VOC and the like is "○"; the evaluation of the moist heat resistance is "○"; the evaluation of the storage stability is "○"; the evaluation of the thermal stability is "○"; and the comprehensive evaluation is "○". The laminate of Example B2 has a low VOC, good flame retardancy and good thermal characteristics.

Comparative Example B1

The foamed polyurethane layer of Comparative Example B1 is obtained from a foamable polyurethane resin composition containing 100 parts by mass of a polyol, 5 parts by mass of the flame retardant 2 (phosphorus-containing solid flame retardant), 3.9 parts by mass of a foaming agent (water), 1.1 parts by mass of a foam stabilizer, 0.18 part by mass of an amine catalyst, and 0.8 part by mass of the metal catalyst 1 (active hydrogen group-containing tin ricinoleate), and having an isocyanate index of 103. The foamed polyurethane layer of Comparative Example B1 has a density of 25.0 kg/m³, a tensile strength of 97 kPa, and an elongation of 198%.

The laminate of Comparative Example B1 is obtained by adhering a coating layer to one surface of a foamed polyurethane layer by the polyurethane hot melt adhesive 1, in which the burning distance is 0 mm and the determination of the flammability is "non-flammable"; the VOC value is 79 ppm, the FOG value is 30 ppm, the TVOC value is 18 μgC/g, and the evaluation of the VOC and the like is "◯"; the evaluation of the moist heat resistance is "X"; the evaluation of the storage stability is "◯"; the evaluation of the thermal stability is "◯"; and the comprehensive evaluation is "Δ". The laminate of Comparative Example B1 has good flame retardancy and a low VOC.

Comparative Example B2

The foamed polyurethane layer of Comparative Example B2 is obtained from the same foamable polyurethane resin composition as in Example B1, and the physical property values are the same as those of the foamed polyurethane layer of Example B1. The laminate of Comparative Example B2 is obtained by adhering a coating layer to one surface of a foamed polyurethane layer by the polyurethane hot melt adhesive 1, in which the burning distance is 0 mm and the determination of the flammability is "non-flammable"; the VOC value is 74 ppm, the FOG value is 42 ppm, the TVOC value is 15 μgC/g, and the evaluation of the VOC and the like is "◯"; the evaluation of the moist heat resistance is "X"; the evaluation of the storage stability is "◯"; the evaluation of the thermal stability is "◯"; and the comprehensive evaluation is "Δ". The laminate of Comparative Example B2 has good flame retardancy and a low VOC.

Comparative Example B3

The foamed polyurethane layer of Comparative Example B3 is obtained from a foamable polyurethane resin composition containing 100 parts by mass of a polyol, 4 parts by mass of the flame retardant 1 (melamine powder), 4 parts by mass of the flame retardant 2 (phosphorus-containing solid flame retardant), 3 parts by mass of a foaming agent (water), 1.5 parts by mass of a foam stabilizer, 0.1 part by mass of an amine catalyst, and 2.75 parts by mass of the metal catalyst 1 (active hydrogen group-containing tin ricinoleate), and having an isocyanate index of 110. The foamed polyurethane layer of Comparative Example B3 has a density of 34.9 kg/m³, a tensile strength of 132 kPa, and an elongation of 204%.

The laminate of Comparative Example B3 is obtained by adhering a coating layer to one surface of a foamed polyurethane layer by the polyurethane hot melt adhesive 1, in which the burning distance is 0 mm and the determination of the flammability is "non-flammable"; the VOC value is 86 ppm, the FOG value is 59 ppm, the TVOC value is 3 μgC/g and the evaluation of the VOC and the like is "◯"; the evaluation of the moist heat resistance is "X"; the evaluation of the storage stability is "◯"; the evaluation of the thermal stability is "◯"; and the comprehensive evaluation is "Δ". The laminate of Comparative Example B3 has good flame retardancy and a low VOC.

Comparative Example B4

The foamed polyurethane layer of Comparative Example B4 is obtained from the same foamable polyurethane resin composition as in Example B1, and the physical property values are the same as those of the foamed polyurethane layer of Example B1.

The laminate of Comparative Example B4 is obtained by adhering a coating layer to one surface of a foamed polyurethane layer by the polyurethane hot melt adhesive 2, in which the burning distance is 0 mm and the determination of the flammability is "non-flammable"; the VOC value is 70 ppm, the FOG value is 34 ppm, the TVOC value is 14 μgC/g, and the evaluation of the VOC and the like is "◯"; the evaluation of the moist heat resistance is "X"; the evaluation of the storage stability is "◯"; the evaluation of the thermal stability is "◯"; and the comprehensive evaluation is "Δ". The laminate of Comparative Example B4 has good flame retardancy and a low VOC.

Comparative Example B5

The foamed polyurethane layer of Comparative Example B5 is obtained from the same foamable polyurethane resin composition as in Example B1, and the physical property values are the same as those of the foamed polyurethane layer of Example B1.

The laminate of Comparative Example B5 is obtained by adhering a coating layer to one surface of a foamed polyurethane layer by the polyurethane hot melt adhesive 3, in which the burning distance is 0 mm and the determination of the flammability is "non-flammable": the VOC value is 69 ppm, the FOG value is 41 ppm, the TVOC value is 8 μgC/g, and the evaluation of the VOC and the like is "◯"; the evaluation of the moist heat resistance is "X"; the evaluation of the storage stability is "◯"; the evaluation of the thermal stability is "◯"; and the comprehensive evaluation is "Δ". The laminate of Comparative Example B5 has good flame retardancy and a low VOC.

Comparative Example B6

The foamed polyurethane layer of Comparative Example B6 is obtained from the same foamable polyurethane resin composition as in Example B1, and the physical property values are the same as those of the foamed polyurethane layer of Example B1.

The laminate of Comparative Example B6 is obtained by adhering a coating layer to one surface of a foamed polyurethane layer by the polyurethane hot melt adhesive 4, in which the burning distance is 0 mm and the determination of the flammability is "non-flammable"; the VOC value is 88 ppm, the FOG value is 53 ppm, the TVOC value is 10 μgC/g, and the evaluation of the VOC and the like is "◯"; the evaluation of the moist heat resistance is "X"; the evaluation of the storage stability is "◯"; the evaluation of the thermal stability is "◯"; and the comprehensive evaluation is "Δ". The laminate of Comparative Example B6 has good flame retardancy and a low VOC.

Comparative Example B7

The foamed polyurethane layer of Comparative Example B7 is obtained from a foamable polyurethane resin composition containing 100 parts by mass of a polyol, 15 parts by mass of the flame retardant 1 (melamine powder), 4.3 parts by mass of a foaming agent (water), 1.1 parts by mass of a foam stabilizer, 0.18 part by mass of an amine catalyst, and 0.31 part by mass of the metal catalyst 2 (stannous octylate), and having an isocyanate index of 103. The foamed polyurethane layer of Comparative Example B7 has a density of 24.6 kg/m³, a tensile strength of 70 kPa, and an elongation of 97%.

The laminate of Comparative Example B7 is obtained by adhering a coating layer to one surface of a foamed polyurethane layer by the polyurethane hot melt adhesive 1, in which the burning distance is 10 mm and the determination of the flammability is "self-extinguishing"; the VOC value is 446 ppm, the FOG value is 43 ppm, and the evaluation of the VOC and the like is "X"; the evaluation of the moist heat resistance is "X"; the evaluation of the storage stability is "○"; the evaluation of the thermal stability is "○"; and the comprehensive evaluation is "X". In Comparative Example B7, the flame retardancy is poor and the VOC is high since the phosphorus-containing solid flame retardant is not contained in the flame retardant and the active hydrogen group-containing tin ricinoleate is not contained in the metal catalyst.

Comparative Example B8

The foamed polyurethane layer of Comparative Example B8 is obtained from a foamable polyurethane resin composition containing 100 parts by mass of a polyol, 20 parts by mass of the flame retardant 1 (melamine powder), 4.7 parts by mass of a foaming agent (water), 1.1 parts by mass of a foam stabilizer, 0.18 part by mass of an amine catalyst, and 0.31 part by mass of the metal catalyst 2 (stannous octylate), and having an isocyanate index of 103. The foamed polyurethane layer of Comparative Example B8 has a density of 25.5 kg/m, a tensile strength of 56 kPa, and an elongation of 64%.

The laminate of Comparative Example B8 is obtained by adhering a coating layer to one surface of a foamed polyurethane layer by the polyurethane hot melt adhesive 1, in which the burning distance is 0 mm and the determination of the flammability is "non-flammable"; the VOC value is 434 ppm, the FOG value is 61 ppm, and the evaluation of the VOC and the like is "X"; the evaluation of the moist heat resistance is "X"; the evaluation of the storage stability is "○"; the evaluation of the thermal stability is "○"; and the comprehensive evaluation is "X". In Comparative Example B8, the determination of the flammability is "non-flammable" since the content of the melamine powders is higher than that in Comparative Example B7, but the VOC is high since the active hydrogen group-containing tin ricinoleate is not contained in the metal catalyst.

(Comparative Example B9)

The foamed polyurethane layer of Comparative Example B9 is the same as that of Comparative Example B1, except that 0.31 parts by mass of the metal catalyst 2 (stannous octylate) is used instead of the metal catalyst 1 (active hydrogen group-containing tin ricinoleate) in Comparative Example B1. The foamed polyurethane layer of Comparative Example B9 has a density of 25.6 kg/m³, a tensile strength of 114 kPa, and an elongation of 206%.

The laminate of Comparative Example B9 is obtained by adhering a coating layer to one surface of a foamed polyurethane layer by the polyurethane hot melt adhesive 1, in which the burning distance is 0 mm and the determination of the flammability is "non-flammable"; the VOC value is 639 ppm, the FOG value is 78 ppm, and the evaluation of the VOC and the like is "X"; the evaluation of the moist heat resistance is "X"; the evaluation of the storage stability is "○"; the evaluation of the thermal stability is "○"; and the comprehensive evaluation is "X". In Comparative Example B9, as compared with Comparative Example B1, the VOC value is very large since the metal catalyst 1 (active hydrogen group-containing tin ricinoleate) is not contained.

Comparative Example B10

The foamed polyurethane layer of Comparative Example B10 is the same as that of Comparative Example 2, except that 4 parts by mass of the flame retardant 3 (phosphorus-containing liquid flame retardant) is used instead of 4 parts by mass of the flame retardant 2 (phosphorus-containing solid flame retardant) in Comparative Example B2. The foamed polyurethane layer of Comparative Example B10 has a density of 24.8 kg/m³, a tensile strength of 105 kPa, and an elongation of 201%.

The laminate of Comparative Example B10 is obtained by adhering a coating layer to one surface of a foamed polyurethane layer by the polyurethane hot melt adhesive 1, in which the burning distance is 0 mm and the determination of the flammability is "non-flammable"; the VOC value is 219 ppm, the FOG value is 1242 ppm, and the evaluation of the VOC and the like is "X"; the evaluation of the moist heat resistance is "X"; the evaluation of the storage stability is "○"; the evaluation of the thermal stability is "○"; and the comprehensive evaluation is "X". In Comparative Example B10, as compared with Comparative Example B2, the VOC value and the FOG value are very large since the flame retardant 3 (phosphorus-containing liquid flame retardant) is used instead of the flame retardant 2 (phosphorus-containing solid flame retardant).

Comparative Example B11

The foamed polyurethane layer of Comparative Example B11 is obtained from the same foamable polyurethane resin composition as in Comparative Example B3, and the physical property values are the same as those of the foamed polyurethane layer of Comparative Example B3.

The laminate of Comparative Example B11 is obtained by adhering a coating layer to one surface of a foamed polyurethane layer by frame lamination, in which the burning distance is 0 mm and the determination of the flammability is "non-flammable"; the VOC value is 260 ppm and the evaluation of the VOC and the like is "X"; the evaluation of the moist heat resistance is "X"; the evaluation of the storage stability is "○"; the evaluation of the thermal stability is "○"; and the comprehensive evaluation is "X". In Comparative Example B11, as compared with Comparative Example B3, the VOC value is very large since the adhesion is made using the frame lamination.

Comparative Example B12

The foamed polyurethane layer of Comparative Example B12 is obtained from the same foamable polyurethane resin composition as in Comparative Example B3, and the physical property values are the same as those of the foamed polyurethane layer of Comparative Example B3.

The laminate of Comparative Example B12 is obtained by adhering a coating layer to one surface of a foamed polyurethane layer by the polyurethane hot melt adhesive 5, in which the burning distance is 0 mm and the determination of the flammability is "non-flammable"; the VOC value is 128 ppm, the FOG value is 219 ppm, the TVOC value is 16 µgC/g, and the evaluation of the VOC and the like is "X"; the evaluation of the moist heat resistance is "X"; the evaluation of the storage stability is "○"; the evaluation of the thermal stability is "○"; and the comprehensive evaluation is "X". In Comparative Example B12, as compared with Comparative Example B3, the VOC value and the FOG value are very large since a hot-melt adhesive containing, as a raw material, a polyol component (A) containing no crystalline polyester polyol (a-1) containing a condensation reaction product of an aliphatic dicarboxylic acid having 10 to 12 carbon atoms and an aliphatic diol having 4 to 6 carbon atoms is used.

Thus, the laminates of Example B1 and Example B2 in which the coating layer is adhered to one surface of the foamed polyurethane layer of the present invention by the polyurethane hot melt adhesive of the present invention have a low VOC, good flame retardancy and good thermal characteristics, so that they are suitable as a member constituting a skin material for a vehicle interior member. Further, since the laminates of Example B1 and Example B2 have a low VOC, good flame retardancy and good thermal characteristics, a laminate in which a surface layer containing genuine leather, synthetic leather, fabric, or the like is adhered by the polyurethane hot melt adhesive of the present invention also has a low VOC, good flame retardancy and good thermal characteristics as compared with a laminate with a surface layer adhered by frame lamination, so it is also suitable as a skin material for a vehicle interior member.

Although the present invention has been described in detail and by reference to specific embodiments, it is apparent to those skilled in the art that it is possible to add various alterations and modifications without departing from the spirit and the scope of the present invention. This application is based on Japanese Patent Application (Japanese Patent Application No. 2017-248481) filed on Dec. 25, 2017, Japanese Patent Application (Japanese Patent Application No. 2018-174726) filed on Sep. 19, 2018, and Japanese Patent Application (Japanese Patent Application No. 2018-210967) filed on Nov. 8, 2018, the contents of which are incorporated herein by reference. In addition, all references referred herein are entirely incorporated.

REFERENCE SIGNS LIST 10, 20 laminate
11 foamed polyurethane layer
13, 17 polyurethane hot melt adhesive
15 coating layer
19 surface layer

The invention claimed is:

1. A laminate comprising:
    a foamed polyurethane layer obtained from a foamable polyurethane resin composition containing a polyol, a polyisocyanate, a foaming agent, a catalyst and a flame retardant; and
    a coating layer mounted on the foamed polyurethane layer,
    wherein the foamable polyurethane resin composition contains an active hydrogen group-containing tin ricinoleate as the catalyst and a phosphorus-containing solid flame retardant as the flame retardant,
    the foamed polyurethane layer and the coating layer are adhered by a polyurethane hot melt adhesive containing a polyurethane prepolymer (I) obtained by using a polyol component (A) and a polyisocyanate component (B) as raw materials, and a catalyst (II),
    the polyisocyanate component (B) in the polyurethane hot melt adhesive contains more than 0.5 mass % and 10 mass % or less of a carbodiimide-modified diphenylmethane diisocyanate based on the total mass of polyisocyanate component (B), and
    the catalyst (II) includes a reactive catalyst having a functional group that reacts with an isocyanate group.

2. The laminate according to claim 1, wherein the reactive catalyst is a catalyst having one of the functional group that reacts with an isocyanate group and having a tertiary amine structure.

3. The laminate according to claim 1, wherein
    the polyol component (A) contains a crystalline polyester polyol (a-1) containing a condensation reaction product of an aliphatic dicarboxylic acid having 10 to 12 carbon atoms and an aliphatic diol having 4 to 6 carbon atoms, and a polyether polyol (a-2), and
    a content of the polyether polyol (a-2) in the polyol component (A) is 30 mass % to 80 mass % based on 100 mass % of the polyol component (A).

4. The laminate according to claim 3, wherein the crystalline polyester polyol (a-1) has a number average molecular weight of 1,000 to 5,000, and the polyether polyol (a-2) has a number average molecular weight of 1,000 to 4,000.

5. The laminate according to claim 1, wherein the foamable polyurethane resin composition further contains, as the flame retardant, a melamine powder having an average particle diameter of 0.1 μm to 0.5 μm.

6. The laminate according to claim 1, wherein the phosphorus-containing solid flame retardant in the foamable polyurethane resin composition is a phosphate ester compound.

7. The laminate according to claim 1, wherein the polyol component (A) of the polyurethane prepolymer (I) in the polyurethane hot melt adhesive contains one or more polyols selected from the group consisting of an amorphous polyester polyol, a polycarbonate polyol, and a low molecular weight diol having a number average molecular weight of 500 or less.

8. The laminate according to claim 1, wherein a surface layer is adhered by the polyurethane hot melt adhesive to a surface of the foamed polyurethane layer opposite to a surface on which the coating layer is mounted.

9. A skin material for vehicle interior member, using the laminate according to claim 8.

* * * * *